United States Patent Office 3,535,314
Patented Oct. 20, 1970

3,535,314
PROCESS FOR THE PREPARATION OF 14β-HYDROXY-3-KETO-5β-CARD-20(22)-ENOLIDES
Werner Fritsch, Neuenhain, Taunus, Ulrich Stache and Werner Haede, Hofheim, Taunus, and Kurt Radscheit, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Jan. 3, 1968, Ser. No. 695,348
Claims priority, application Germany, Jan. 5, 1967, F 51,179
Int. Cl. C07c 173/02
U.S. Cl. 260—239.57
2 Claims

ABSTRACT OF THE DISCLOSURE

Method for preparing 14β-hydroxy-3-oxo-5β-card-20(22)-enolides by ketalizing the corresponding Δ$^{14}$-compounds, introducing a 14β-hydroxy group and a 15α-bromo group into the ketal by reaction with an N-halogen amide, debrominating by hydrogenation, and deketalizing by hydrolysis.

---

The present invention relates to a process for the preparation of 14β-hydroxy-3-oxo-5β-card-20(22)-enolides, which comprises ketalizing 3-oxo-5β-carda-14(15)-20(22)-dienolides, converting the 3-ketals thus obtained with N-halogen amides under weakly acid conditions into the 3-ketals of the 3-oxo-14β-hydroxy-15α-bromo-5β-card-20(22)-enolides, catalytically hydrogenating the latter, the pH of the reaction mixture being within the range from 4.5–7, and deketalizing under weakly acid conditions the 3 - ketals of the 3 - oxo-14β-hydroxy-5β-card-20(22)-enolides thus obtained.

The process of the present invention is carried out, for example, according to the following general scheme

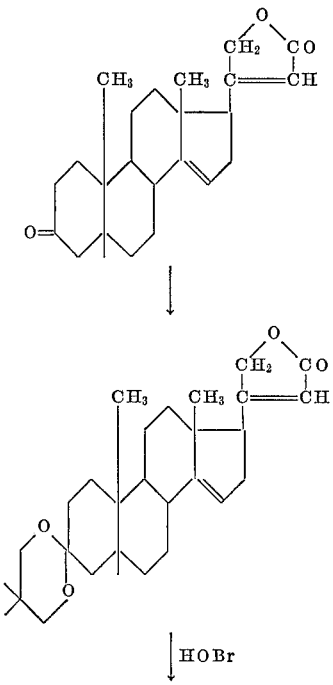

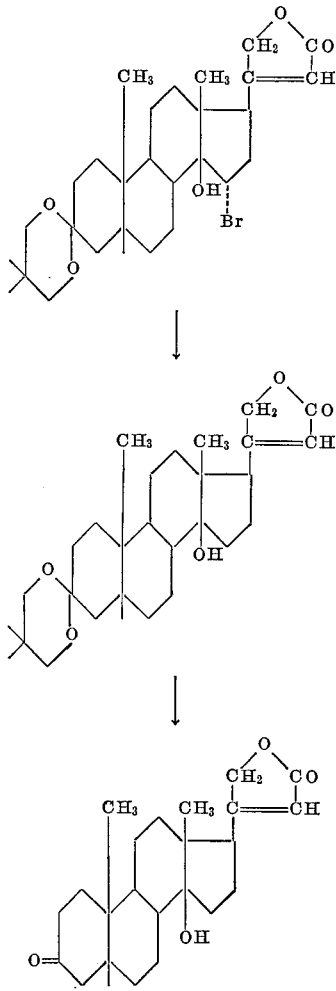

The 3-oxo-5β-carda-14(15)-20(22)-dienolides used as starting substances may contain further substituents, for example, acyloxy- or alkyl groups in 1-, 2-, 4-, 7-, 11-, 12-, 16- or 17-position. These dienolides can be prepared, for example, according to the process described in patent application No. 616,796 now U.S. Pat No. 3,455,910 for example by reacting, a 15,21-dihydrohalic acid ester of a 3,20-dioxo-pregnane with an alkali metal salt of a malonic acid semi-ester and subsequently treating the compound obtained with tertiary organic bases.

The ketalization of the 3-oxo-5β-carda-14(15)-20(22)-dienolides in the first phase of the process is carried out in the usual manner by reacting with glycols, advantageously by boiling using a water separator with a water entrainer such as, benzene in the presence of catalytic amounts of an acid, for example, p-toluene-sulfonic acid. The ketalization may also be carried out by slowly distilling off the glycol used in vacuo at elevated temperatures without using a water entrainer, but likewise in the presence of catalytic amounts of an acid. The ketals thus obtained are subsequently reacted with N-halogen amides in such a manner that the ketal-grouping is not split off. It is preferable to use N-bromamides, i.e. both N-bromo-carbamides such as, N-bromoacetamide or N-bromosuccinimide, and N-bromosulfonamides, preferably those of aromatic sulfonic acids, for example, N,N-dibromobenzene-sulfonamide. The reaction is advantageously carried out in an acetic acid solution in the presence of inert solvents, such as ethers, for example, dioxan, tetrahydrofuran or diethylene glycol dimethyl ether.

Under these conditions the ketal grouping is, surprisingly, not split off. Further, purification of the crude halohydrins thus obtained is unnecessary and they are immediately submitted to hydrogenation. For selective hydrogenation according to the process of the present invention, the reaction medium has to be maintained at a pH within the range of from 4.5–7.

The hydrogenation according to the process of the present invention is carried out with catalytically activated hydrogen. As catalysts, noble metals are especially suitable and are used either in fine suspension or on a carrier under normal conditions. Especially advantageous is the use of Raney-nickel activated with a suitable noble metal, for example, palladium. This catalyst is advantageously freed from excess alkali by first treating it with a dilute weak acid, for example, acetic acid.

By continuously adding a buffer solution, for example, sodium acetate glacial acetic acid in methanol, which is suitable for neutralizing hydrogen halide, the pH value of the reaction mixture is maintained during hydrogenation at 4.5–7.0, preferably within the range of from 5.5 to 6.5. After absorption of 1 mol-equivalent of hydrogen, the hydrogenation stops. As solvents there may be used such solvents which are known to be suitable for use in hydrogenation reactions, for example, low molecular weight alcohols, tetrahydrofuran or dioxan as well as mixtures thereof.

The ketal splitting effected in the last phase is carried out in a weakly acid medium in order to prevent the 14β-hydroxy group from splitting off. It is advantageous to heat the whole during, for example, 30 minutes to 1 hour in aqueous acetic acid of 70% strength to a temperature between 90 and 100° C.

The hydrogenation according to the process of the present invention is quite surprising. It is known that the 20(22)-double bond in the lactone ring can be hydrogenated at normal pressure and at room temperature on the one hand by means of Raney-nickel/$H_2$ (Helv. chim. acta. 24, 716 (1941)), and on the other hand by means of palladium/$H_2$ (J. biol. Chemistry 54, 253 (1922)) hence, it could not have been expected that bromine could be split off hydrogenolytically by means of catalytically activated hydrogen from the 15-position without attacking the 20(22)-double bond, as is the case in the process of the present invention.

The products of the present invention are used as intermediates in the preparation of pharmaceuticals having ionotropic, cardiovascular and diuretic effects, by a process wherein the 3-keto-group is partially reduced in the usual manner and converted into the 3-β-OH-group by subsequent epimerization.

The following example illustrates the invention:

EXAMPLE (a) 3-(2,2-dimethyl-1,3-propandioxy)-5β-carda-14(15)-20(22)-dienolide

A solution of 4.2 g. of 5β-carda - 14(15)-20(22)-dienolide - 3 - one, 186 g. of neopentylglycol (2,2 - dimethyl-1,3-dihydroxypropane, and 95 mg. of p-toluenesulfonic acid in 30 ml. of benzene is briskly heated to boiling for 2 hours under reflux and with interposition of a water separator. After cooling, the reaction mixture is combined with ether and a small amount of methylene chloride, washed with a solution of sodium hydrocarbonate and water until it is neutral, dried over sodium sulfate and, after the addition of 2 drops of pyridine, concentrated to dryness under reduced pressure. After recrystallization from a mixture of methylene chloride and methanol in the presence of one drop of pyridine, 1.24 g. of 3-(22-dimethyl - 1,3 - propandioxy)-5β-carda-14(15)-20(22)-dienolide melting at 238° C. (Kofler heater) are obtained.

(b) 3-(2,2-dimethyl-1,3-propandioxy)-15α-bromo-14β-hydroxy-5β-card-20(22)-enolide 1.76 g. of 3-(2,2 - dimethyl-1,3-propandioxy)-5β-carda-14(15)-20(22)-dienolide are dissolved at a raised temperature in 50 ml. of dioxan. After cooling to about 10° C., whereby a large part of the ketal reprecipitates, a mixture of 1.1 ml. of glacial acetic acid and 9.2 ml. of water is added. Then 630 mg. of newly recrystallized N,N-dibromobenzenesulfonamide are immediately added while cooling with ice and stirring at a maximum temperature of 3° C. After a short period a clear solution is obtained from which a precipitate is gradually formed. After stirring for altogether 1 hour in the ice bath the reaction mixture is introduced, within 1 minute, while stirring, into 60 ml. of icewater. The precipitate obtained is then thoroughly washed with water and, subsequently, dried in high vacuum at 25° C. over sodium hydroxide. Thus 1.74 g. of 3 - (2,2 - dimethyl - 1,3-propandioxy)-15α-bromo-14β-hydroxy - 5β - card - 20(22)-enolide melting at 190–200° C. (according to the rate of heating) (Kofler heater) (with decomposition) are obtained. (Br calculated: 14.9%; found: 14.8%.

(c) 3-(2,2-dimethyl-1,3-propandioxy)-14β-hydroxy-5β-card-20(22)-enolide (1) Preparation of the catalyst:—The catalyst used during the hydrogenation is prepared as follows:

3.6 g. of Raney-nickel are stirred with 20 ml. of water for 5 minutes. The water is decanted and, subsequently, the residue is suspended in 50 ml. of water. Gradually a solution of 900 mg. of palladium dichloride in a mixture of 100 ml. of water and 1.0 ml. of concentrated hydrochloric acid is introduced into the stirred suspension, whereby the pH must not fall below 3.1. The catalyst is filtered off with suction, thoroughly washed with water and, subsequently, treated three times by stirring with methanol and decanting. The catalyst is weighed in the moist state.

(2) Hydrogenation.—A solution of 1.21 g. of 3-(2,2-dimethyl - 1,3 - propandioxy) - 15α-bromo-14β-hydroxy-5β - card - 20(22) - enolide in a mixture of 20 ml. of methylene chloride is introduced into a pre-hydrogenated suspension of the above-mentioned catalyst in 70 ml. of methanol and 1 ml. of water.

After adding the solution of bromohydrin, catalytic hydrogenation is immediately effected. Simultaneously the pH of the reaction mixture is maintained at a value of from 6.2 to 6.6 by continuously adding dropwise a buffer solution prepared from 4.62 g. of sodium acetate containing water of crystallization, 4.00 ml. of glacial acetic acid and 23 ml. of methanol. After about 7 hours 1 mol-equivalent of hydrogen is absorbed and the hydrogenation stops. Subsequently the product is filtered off from the catalyst, the filtrate is concentrated in vacuo to about 20 ml., diluted with a small amount of water and then extracted with a mixture of methylene chloride and ether. After washing with sodium hydrocarbonate solution and water and drying over sodium sulfate, the organic phase is concentrated to dryness under reduced pressure. After recrystallization of the residue from ether, 475 mg. of 3 - (2,2 - dimethyl - 1,3-propandioxy)-14β-hydroxy-5β-card-20(22)-enolide melting at 203–205° C. are obtained.

(d) 14β-hydroxy-3-oxo-5β-card-20(22)-enolide (digitoxigenone)

150 mg. of 3 - (2,2 - dimethyl - 1,3-propandioxy)-14β-hydroxy-5β-card-20(22)-enolide are heated for 40 minutes on a steam bath under an atmosphere of nitrogen in 1.0 ml. of acetic acid of 70% strength, whereupon after a short period the substance completely dissolves. After cooling, the solution obtained is combined with 10 ml. of water and then extracted with methylene chloride. The extract thus obtained is washed twice with a large quantity of water. After drying over sodium sulfate, the extract is concentrated to dryness under reduced pressure. The residue is combined with a small amount of ether and triturated after the addition of one drop of methanol, whereupon crystallization sets in. After filtering, 56 mg. of 14β-hydroxy - 3 - oxo - 5β-card-20(22)-enolide melting at hydroxy-5β-card-20(22)-enolides thus obtained.

We claim:
1. A process for the preparation of 14β - hydroxy - 3-oxo-5β-card-20(22)-enolides which comprises ketalizing 3 - oxo - 5β - carda-14(15)-20(22)-dienolides, converting the 3-ketals thus obtained with N-halogen amides under weakly acid conditions into the 3-ketals of the 3-oxo-14β-hydroxy - 15α - bromo - 5β-card-20(22)-enolides, catalytically hydrogenating the latter at a pH of from 4.7 to 7, and hydrolytically splitting off the ketal groups under weakly acid conditions from the 3-ketals of the 3-oxo-14β-hydroxy-5β-card-20(22)-enolides thus obtained.

2. 3 - (2,2 - dimethyl - 1,3-propandioxy)-15α-bromo-14β-hydroxy-5β-card 20(22)-enolide.

References Cited

UNITED STATES PATENTS 3,008,960 11/1961 Patchett _____ 260—239.57
3,432,486 3/1969 Minato _____ 260—210.5

OTHER REFERENCES

Loewenthal: Tetrahedron, vol. 6, No. 4, June 1959, pp. 287–289.
Fieser et al.: Steroids (1959), p. 756.

HENRY A. FRENCH, Primary Examiner

U.S. Cl. X.R.

260—999